UNITED STATES PATENT OFFICE.

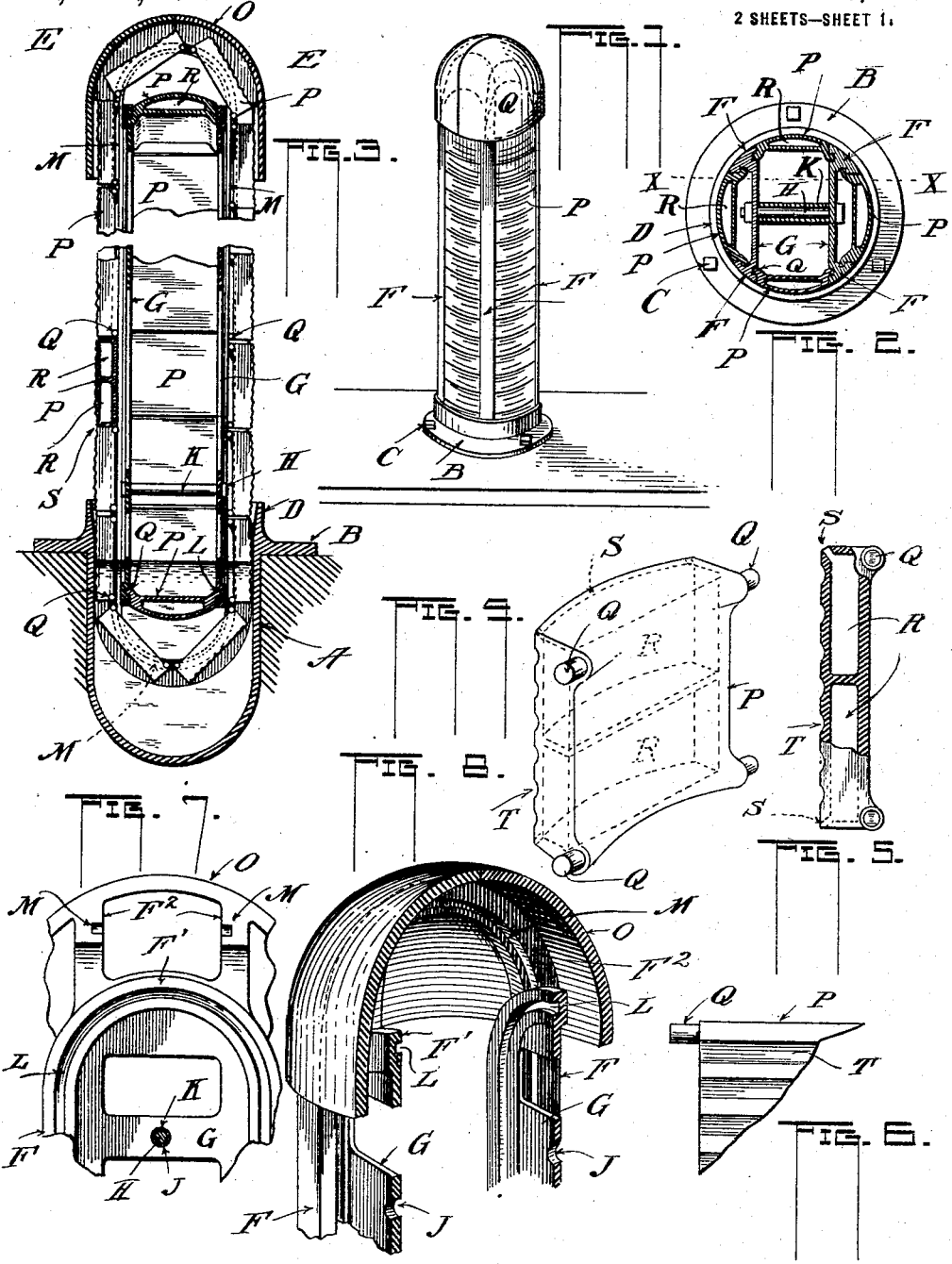

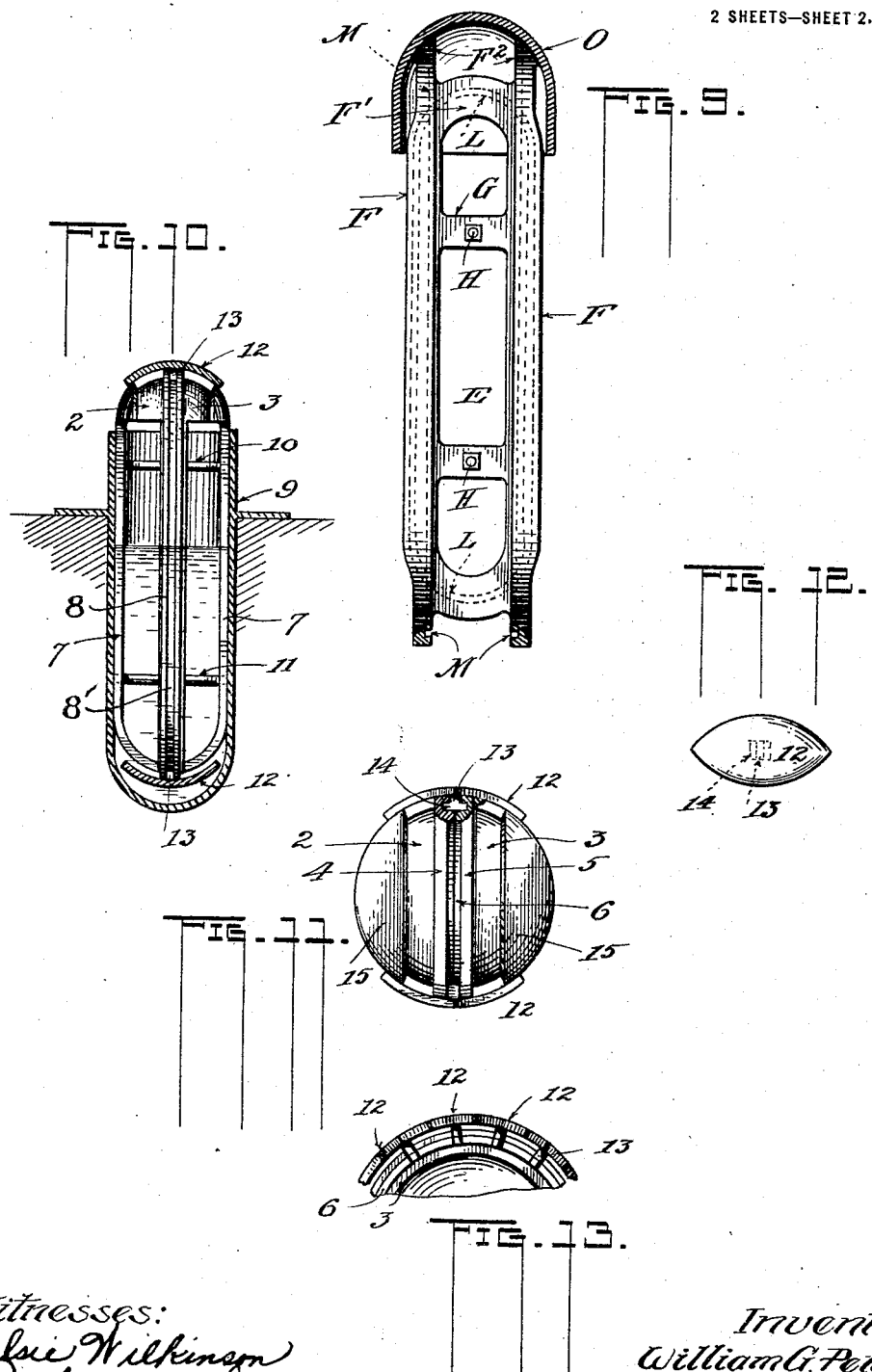

WILLIAM G. PETERS, OF PEORIA, ILLINOIS, ASSIGNOR TO ERNEST STARBUCK, OF PEORIA, ILLINOIS.

HOG-GREASER.

1,189,172. Specification of Letters Patent. Patented June 27, 1916.

Application filed July 12, 1911, Serial No. 638,064. Renewed September 29, 1915. Serial No. 53,199.

*To all whom it may concern:*

Be it known that I, WILLIAM G. PETERS, a citizen of the United States, residing at Peoria, in the county of Peoria and State of Illinois, have invented certain new and useful Improvements in Hog-Greasers; and I do hereby declare that the following is a full, clear, and exact description of the invention, which will enable others skilled in the art to which it appertains to make and use the same.

This invention pertains to an improvement in that type of devices known as hog greasers.

One of the objects, as in other devices of this character, is to provide a member exposing a surface to carry grease or a disinfectant for destroying vermin on hogs.

Another object of the present invention is to provide a device of the character mentioned having a receptacle in its base holding the grease or solution and a series of members or devices to pass into and out of the grease or solution and carry it to a position where the animal can rub against it, the superfluous portions of the said grease or solution passing back into the said receptacle.

A further object is the provision of means to elevate a quantity of the grease or solution and deposit it upon the various parts of the device so that the animals in rubbing against said parts will be well covered with the said grease or solution.

A further object is to provide a hog greasing device in which substantially every part of its surface will carry the grease or solution so that the animal will always receive a coating of it.

Another object is to provide a rubbing post substantially round so that a broad greased rubbing surface is provided for the animal no matter from what direction he approaches.

An important object also is to construct a rubbing post or hog greaser requiring little or no machine work and but little time and work in assembling it and which can be readily taken apart and cleaned. And still another object is to construct a device of this nature whose grease-carrying parts can be readily removed from the receptacle of said device to admit of cleaning and refilling said receptacle.

Besides the above objects the invention relates to certain details of construction to be pointed out herein aided by the accompanying drawing in which:

Figure 1, in perspective, shows the general appearance of my improved hog greaser. Fig. 2 is a horizontal section of the same. Fig. 3 is a sectional elevation, somewhat enlarged, taken on dotted line $x$ $x$ in Fig. 2. Fig. 4, in perspective, shows a grease carrying member. Fig. 5 is a sectional elevation of the same. Fig. 6 shows a portion of the front face of the said member. Fig. 7 shows a portion of the upper part of one-half of the device showing tracks lying in planes perpendicular to one another. Fig. 8, in perspective, shows a portion of the top of the device in section, said section being taken on a plane perpendicular to the face shown in Fig. 7. Fig. 9 is a side elevation of part of the device. Fig. 10 is an elevation, in part section, of a slightly different form of device. Fig. 11 is a plan of a part thereof. Fig. 12 is a plan of a traveling member, and Fig. 13 is an elevation showing the ends of a series of traveling members as they appear in use.

The device consists first of a base A provided with a recess constituting a receptacle for grease or a disinfecting solution and which may be set in the ground or for instance in a solid cement base buried in the ground, said base or receptacle preferably having a flange B to receive bolts C, for example, to secure it firmly in the concrete or in any other support that may be used. Preferably uprising from the base is an extension D of the base whose inner surface is outwardly flared for guiding the grease back into the receptacle as will be described presently.

E E indicate two halves of a cast frame adapted to be bolted together and afterward introduced into and seated in the recess of the base A, as indicated in Fig. 3 being sustained in an upright position by reason of a long sliding fit therein and from which it can be readily withdrawn when desired. The upper portion of one-half of this frame is shown in Fig. 7 and it is shown in its entirety in Fig. 9. The halves of said frame comprise two uprights F as indicated in Fig. 2 connected by a web G through which bolts H pass for securing the said halves together, see Fig. 7, said bolts extending through holes J in said web there being a tubular spacing member K, for example, through which the bolt passes and against whose ends the webs G abut thereby spacing both castings apart. After being assembled the device appears as in Fig. 9 and consists of four uprights whose outer surfaces describe arcs of a circle struck from the center of the device, as shown in Fig. 2, and each upright branches at the top and bottom into arched portions F' and F² lying in planes perpendicular to one another. Since the framing is in two parts, preferably, the arched portions F' are continuous at the top and bottom, Figs. 7 and 9, while the arches F² are divided in half since they lie in a plane perpendicular to said arches F' this being perfectly clear by a study of said Fig. 7. The uprights are provided each with two grooves forming runways for certain movable or traveling members as will be explained. One of the grooves or runways which is indicated at L, is formed in the arch F' and is directly opposite a companion groove in the opposite upright as shown in Figs. 2 and 8 while in said uprights are other grooves M which extend into the arches F². The said arches F², as shown in the figures, extend above and below the arches F' so that the grooves or runways in both will be continuous and so that the two separate series of traveling members that lie in them can move independently and so that both said series can pass into and out of the receptacle in the base A.

Preferably there is cast with each half of the arches F² one half of a hood O for protecting the device from the weather and to exclude dirt that might fall into it.

The traveling members referred to are preferably a series of separate members P clearly shown in Figs. 4, 5 and 6. Each is provided with trunnions Q at two opposite sides designed to seat in the oppositely disposed grooves or runways L and M and said members are preferably provided with two recesses R each of which has an outlet at the front side through opening S preferably extending entirely across the same. When the members are placed in position previously to bolting the castings together the runways are entirely filled with them and they practically constitute a continuous series of links after the manner of a chain. The outer faces of the members P are preferably cylindrically curved as shown in Figs. 2 and 4 to complete the circle of which the curved surfaces of the uprights F are a part. When assembled the members P and the uprights form a round post practically the entire surface of which can be utilized.

The outer surfaces of the members are preferably roughened as by providing the horizontally disposed grooves T, for instance, which leave projecting portions substantially as shown so that when the animal rubs against said members there will be sufficient friction to shift the series of members within their runways. Usually a hog when rubbing himself has an upward movement so that in pressing against the members P with said upward movement the tendency will be to raise the said members at that side, while at the other side they will descend after the manner of a chain or belt. As the members are thus made to move they will pass into and out of the solution within the receptacle A so that the grease or solution therein will be carried upward for use.

The receptacles or pockets R in the members P when immersed will become filled and in the upward movement the solution will gradually run out of the recesses therein and down the members below and the solution not used will find its way back into the receptacle A, the flare of the part D insuring this result.

I show in Figs. 10, 11, 12 and 13 a slightly different form of device. Its structure is somewhat lower than that just described being so arranged that the hog when astride it can grease the under portions of his body. It consists of two cast half-dome portions 2 and 3 constituting the top the abutting edges having flanges 4 and 5 respectively which are undercut as shown in Fig. 11 to form a guideway 6 the measurement of whose bottom is greater than the open portion or slot which it creates.

Cast with each half 2 and 3 are two uprights 7 which arch toward one another at the bottom and meet the arching portions of other uprights 8 cast in halves with the said portions 2 and 3 and having continuations 8' of the guideway 6 before mentioned. The uprights 7 are designed to have a snug sliding fit in a receptacle 9 substantially corresponding to the recessed base A of the first form described. The two halves of the device are secured together by means of bolts 10 and 11 which are threaded into the said uprights 7, though other means of securing them may be employed. With this form I use a series of plates 12 curved as shown in Figs. 10 and 11 and shaped in plan substantially as shown in Fig. 12. With the under side of each plate a lug 13 is cast having an enlargement 14 by which it is held within the guideway or slot 6 and within which it is slidable. The edges of these members abut as shown in Fig. 13, and in which figure a part of one half of the casting 3 is shown, said members forming a continuous series as in the first form described. Preferably I cast with the top parts 2 and 3 flanges 15 upon which the ends of the members 12 bear so that the weight of the animal will be firmly supported and without danger of breaking the lugs 13.

Various changes in the structure and arrangement with regard to any of the parts of my hog oiler may be made without departing from the spirit and intent of the invention. For instance, while I show the members P separate, and detached from one another and movable within a guide, obviously they may otherwise be associated and mounted.

I am not aware of a device in the class of hog oilers or hog greasers wherein is employed a traveling chain-like member movable upon a support or guide exposed so as to permit an animal to rub upon it, the parts of the said chain-like member affording a part upon which the animal can rub to relieve irritation and receive a fluid from it, the rubbing action continually advancing the chain into position to take up the fluid.

Having thus described my invention, I claim:—

1. In a device for the purposes described, the combination of a support forming a guide, a series of adjoining devices mounted to travel progressively upon said guide by the rubbing contact of an animal upon said devices, and means to hold a dip supplied to said devices.

2. In a device for the purposes described, the combination of a base to rest upon the ground and forming a receptacle for a dip, a support uprising from and supported on the same and overhanging its interior, and a series of adjoining devices mounted upon the support to travel progressively thereon and adapted to enter the dip and exposed for rubbing contact of and moved by an animal.

3. In a hog greaser, the combination of a supporting frame constituting a guide, a series of closely related devices mounted upon and adapted to travel along said guide, and means to supply a dip to said devices, said devices being in position to be engaged and caused to travel by the rubbing action of an animal upon them.

4. In a device for the purposes described, the combination of a support constituting an endless guide, a series of closely related devices mounted upon and adapted to travel progressively along said guide by the rubbing contact of an animal upon said devices, and means to hold a dip supplied to said devices.

5. In a device for the purposes described, the combination of a support constituting an endless guide, a series of closely related devices mounted upon said guide whereby they may move progressively around the same and in position to receive the rubbing action of an animal by which they are made to move, a portion of the guide lying behind and receiving against it pressure of the devices as the animals rub against them, and means from which a dip is supplied to said devices.

6. In a hog greaser, the combination of a frame including a substantially vertically disposed endless guideway, a series of members movable along it, all of the members being moved by and due to the rubbing contact of an animal upon one or more of them, and means holding a substance to be applied to an animal, the members in their travel adapted to take up the said substance therefrom.

7. In a hog greaser, the combination of a frame having a receptacle for oil, a guide, a series of closely related devices movable along the guide and exposed at their outer sides and free to move by and due to rubbing contact of an animal upon said outer sides, the devices each adapted to enter and receive the oil from said receptacle.

8. In a hog greaser the combination of a receptacle set into the surface of the ground, a guide uprising from and fixed relatively to said receptacle, a series of separate and independent closely related devices slidable in said guide and exposed at their outer sides and adapted to be moved by frictional contact of an animal against them and adapted also to enter the receptacle to take up oil therefrom.

9. The combination in a hog greaser including an endless series of traveling members and a receptacle for oil, of an upright frame arising from said receptacle having a guide to carry the said series of traveling members, said guide having a part to carry the ascending members and a part to carry the descending members, the parts being connected to carry said members, the latter adapted to travel into and out of the receptacle, the guide outside the receptacle arranged to receive pressure of the members upon it by the rubbing action of an animal against them, said rubbing action of the animal imparting a progressive movement to said members.

10. In a machine of the class described, a source of fluid supply, a guide erected adjacent thereto, a series of closely arranged members placed in an endless line mounted to travel upon said guide and arranged to take up the fluid, said members being exposed and actuated by an animal rubbing upon them, the guide including a part to receive the pressure of the members in the rubbing action of the animal upon them.

11. In a machine of the class described, a source of fluid supply, a guide erected adjacent thereto, a series of closely arranged members placed in an endless line mounted to travel upon said guide and arranged to take up the fluid, said members being exposed and actuated by an animal rubbing upon them, the said guide receiving the pressure of the members against it in the rubbing action of the animal upon said members.

12. In a hog greaser the combination of a vertically disposed frame including an endless guideway open at its outer side around the same, and a series of independent abutting devices mounted in said guideway and filling substantially the entire length of the same, and a receptacle through which the members travel for receiving fluid therefrom.

13. In a hog greaser the combination of a vertically disposed frame including an endless guideway lying in a vertical plane, a series of independent abutting devices carried by said guideway filling substantially the entire length of the same and exposed at their outer sides, and a receptacle for a fluid fed to said devices.

14. In a hog greaser the combination of a receptacle for oil, and a vertically disposed frame adjacent to the same including an endless guideway, and a series of independent abutting devices carried by said guideway and adapted to pass into and out of the oil receptacle and exposed at their outer surfaces.

15. In a hog greaser the combination of a receptacle for oil and a frame seated in the same including an endless guideway extending into the receptacle, and a series of closely arranged devices carried by said guideway and exposed at their outer surfaces.

16. In a hog greaser the combination of a receptacle for oil and a frame removably seated in the same including an endless guideway, and a series of independent abutting devices carried by said guideway and exposed at their outer sides and adapted to pass into and out of the oil receptacle.

17. In a hog greaser the combination of a receptacle, a guide uprising therefrom comprising two vertical substantially parallel frame-portions fixed relatively, and an upper and a lower arched connecting portion to constitute together with the vertical portions a continuous track having a guideway, and a series of devices slidable in the guideway and exposed at their outer surfaces and moved by contact of the animal therewith and adapted in their movements to take up liquid from the said receptacle.

18. In a hog greaser the combination of a receptacle for holding a liquid, a frame arising from the receptacle comprising two guide portions lying in different planes and extending into the said receptacle, and a series of independent abutting devices in each of said guide portions and substantially filling the length of the same and movable therein and adapted to pass through the oil in the receptacle.

19. In a hog greaser the combination of a receptacle for holding a liquid, two pairs of frame portions arising from the receptacle, the portions of each pair being parallel to one another and together constituting a continuous guide, said pairs being disposed substantially in vertical planes perpendicular to one another, each portion including a groove in its surface facing one another, and devices extending between and movable within the grooves of each pair of portions and adapted in their travel to take up liquid from the receptacle.

20. In a hog greaser the combination of a receptacle for holding a liquid, a frame depending therein and arising therefrom made up of two guide-portions lying in vertical planes perpendicular to one another and each including a pair of grooves facing one another, and a series of devices slidable in the grooves of each said guide portion and adapted to travel through the receptacle.

21. In a hog greaser, a rigid frame including an endless guideway, a series of devices substantially filling said guideway and movable along the same, said frame including a second endless guideway lying in a plane at right angles to the first guideway, a series of devices substantially filling said guideway and movable along it, and a receptacle for liquid through which the devices are adapted to pass.

22. A hog greaser comprising a rigid frame made up of two portions lying in vertical planes and having two guideways lying in planes at an angle to one another, the outer surfaces of said portions being outwardly rounded or curved, and each lying substantially equidistant from a given point within the frame, a series of devices movable within the guideways and having their outer surfaces substantially flush with the outer rounded or curved surfaces of said portions, and a receptacle to hold a liquid through which the devices pass.

23. A hog greaser comprising a rigid frame made up of two endless track portions lying in vertical planes substantially at right angles to one another, one of them having a substantially central open space inward from its track surface, the other track-portion extending through the open space, a series of devices movable upon the track surface of each portion, and a receptacle for a liquid into which the portions depend, the devices adapted to take up the liquid in their travel.

24. A hog greaser comprising two separable frame portions, each having an endless track-portion, the track-portions of both frame portions facing one another, both of the said separable frame portions including two half-track portions facing one another, the ends of said half track-portions abutting against one another and lying in a plane substantially perpendicular to the first described facing track-portions, a series of devices carried by and movable upon both pairs of track-portions, means to secure the separable frame portions together, and means holding a substance which the devices take up in their travel.

25. A hog greaser comprising a supporting base provided with a recess for grease or solution, a frame removably seated in said base, and two series of members carried by and movable in said frame one of said series lying in a plane perpendicular to the plane of the other series, both series adapted to elevate the grease or solution from said recess.

26. A hog greaser comprising a base provided with a recess constituting a receptacle for grease or a solution, a frame seated in said base and supported at its lower portion in said receptacle and uprising therefrom and provided with a runway, and a series of associated members provided with trunnions and forming an endless carrier for the grease and slidable in said runway, said members being exposed at their outer surfaces to present them to the rubbing action of the animals.

27. A hog greaser comprising a base constituting a receptacle for grease or a solution, a frame resting in and supported thereby and removable therefrom, its lower portion lying within the receptacle and uprising therefrom and provided with a runway, and a series of members provided with trunnions slidable in said runway and exposed above the base and provided with receptacles to elevate the grease or solution.

28. A hog greaser comprising a base constituting a receptacle, a frame removably and slidably fitting into and overhanging the receptacle, said frame uprising therefrom and provided with a runway, and a series of members provided with trunnions slidable in said runway and exposed above the base and provided with receptacles to elevate the grease or solution.

29. A hog greaser consisting of an upright frame and a series of members adapted to travel vertically therein, said members and the frame having cylindrically curved outer surfaces to constitute a substantially round or cylindrical body, and a receptacle for grease or a solution into which the frame depends, the members adapted to take up a part of the contents thereof.

30. A hog greaser including a receptacle adapted to seat in the ground, a frame upstanding from the same including spaced vertically disposed members having cylindrically curved outer surfaces, and a series of members adapted to move vertically between the said vertically disposed members and elevate fluid from the receptacle, the said series of members having cylindrically curved outer surfaces corresponding substantially to the curved surfaces of the vertically disposed members and being substantially flush with the latter, the movable members and said vertically disposed members constituting a substantially round structure.

31. In a hog greaser, a frame made up of a pair of oppositely disposed abutting members provided each with a groove, the groove of one member facing that of the other member, each member being also provided with two half grooves facing one another, and both lying in a plane perpendicular to the first named grooves and terminating at the abutting surfaces of the members, all of the grooves being endless when the members are assembled, a series of members slidable in the grooves, and a receptacle for grease or a solution from which the members take up said grease or solution.

32. A hog greaser consisting of a base constituting a receptacle, a frame removably seated in the receptacle, depending into the same, and having open panels above the base, said frame including endless grooves extending into said base, a cover portion surmounting the frame, and a series of members slidable in the grooves and movable vertically within and opposite the said open panels and adapted to pass into and out of the base.

33. In a hog greaser, a frame consisting of four spaced upright portions disposed in the form of a rectangle and each constituting a corner member of said frame, all of said corner members including connecting arched portions at their upper and lower ends in pairs lying in planes perpendicular to one another, each corner member including a pair of grooves, and each arch portion including a single groove as a continuation each of one of the grooves of the two upright members of which a given arch portion is a part, devices movable in and guided by each of the pairs of grooves, a receptacle for a liquid into which the grooved members depend and into and through which the said devices pass.

34. In a hog greaser, a frame consisting of four spaced upright portions disposed in the form of a rectangle and each constituting a corner member of said frame, all of said corner members including connecting arched portions at their upper and lower ends in pairs lying in planes perpendicular to one another, each corner member including a pair of grooves, and each arch portion including a single groove as a continuation each of one of the grooves of the two upright members of which a given arch portion is a part, a series of members movable in each pair of grooves, and a receptacle for oil into which the grooved members depend, the said series of members adapted to pass therethrough.

35. In a hog greaser, a frame consisting of four spaced upright portions disposed in the form of a rectangle and each including an arched extension at its upper and lower parts lying in two different planes perpendicular to one another and each said arched extension forming a continuation of the upright immediately opposite it, said portions and the arched extensions constituting runways, a series of members carried in and movable through said runways, and a receptacle for oil into which the frame depends.

36. In a hog greaser the combination of a frame, a member movable upon the same comprising a hollow body having a dividing partition separating it into two compartments, said body having two openings in its front wall each communicating with one of the compartments, and a receptacle for a liquid through which the member passes.

37. In a hog greaser the combination of a frame, a member movable upon the same comprising a hollow body having a dividing partition separating it into two compartments, said body having two openings in its front wall each communicating with one of the compartments and with that part of each compartment lying farthest from the dividing partition, and a receptacle for a liquid through which the member passes.

38. In a hog greaser the combination of a frame, a member movable upon the same and provided with a roughened outer face, said member having an interior recess and an opening in its wall communicating with said recess, and a receptacle for a liquid through which the member passes.

39. A hog greaser comprising a frame, a series of closely associated members movable thereon each having a roughened face, and provided with a hollow interior, the members being provided also with openings in their walls communicating with said interior, the opening of one member lying immediately above a next adjacent member, and a receptacle for a liquid through which the members pass.

In testimony whereof I affix my signature, in presence of two witnesses.

WILLIAM G. PETERS.

Witnesses:
L. M. THURLOW,
L. O. EAGLETON.

Copies of this patent may be obtained for five cents each, by addressing the "Commissioner of Patents, Washington, D. C."